J. E. SIRRINE.
OILING DEVICE FOR SILENT CHAINS.
APPLICATION FILED MAY 8, 1919.
1,314,438.
Patented Aug. 26, 1919.
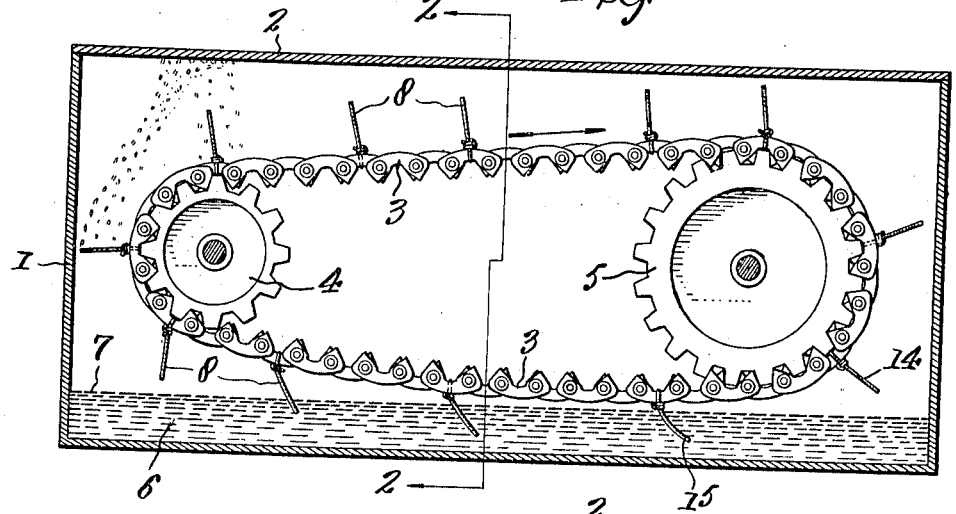
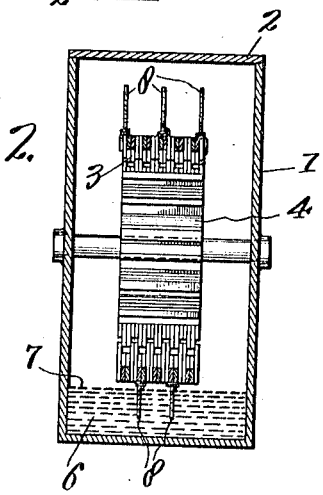
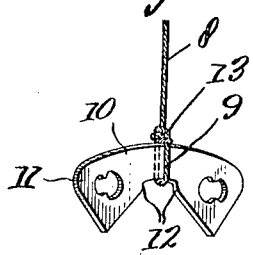
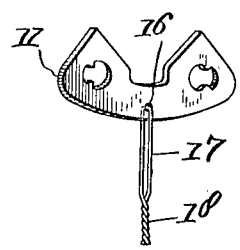
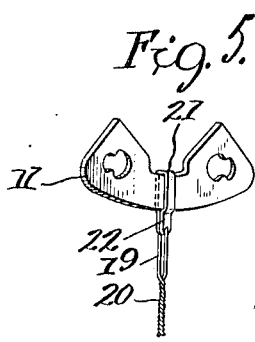
Inventor.
J. E. Sirrine.
by Wilkinson & Giusta
Attorneys.

UNITED STATES PATENT OFFICE.

JOSEPH EMORY SIRRINE, OF GREENVILLE, SOUTH CAROLINA.

OILING DEVICE FOR SILENT CHAINS.

1,314,438.   Specification of Letters Patent.   Patented Aug. 26, 1919.

Application filed May 8, 1919.   Serial No. 295,812.

*To all whom it may concern:*

Be it known that I, JOSEPH E. SIRRINE, a citizen of the United States, residing at Greenville, in the county of Greenville and State of South Carolina, have invented certain new and useful Improvements in Oiling Devices for Silent Chains; and I do hereby declare the following to be a full, clear, and exact description of the invention, such as will enable others skilled in the art to which it appertains to make and use the same.

The present invention relates to improvements in oiling devices for silent chains, and has for an object to more effectually lubricate such chains than has been heretofore possible; the present general practice being to operate high speed silent chains in a casing and either apply lubricant in the form of a grease directly to the chain, or the chain is arranged to run through the lubricant which is placed in the lower half of the casing.

Where the chain runs through the lubricant, it is found that too much of the lubricant is set in motion by the friction of the chain, resulting in high temperature leakage through the casing openings, and an undue consumption of power necessary to drive the chain through the heavy grease.

By the present invention a liquid lubricant is employed through which the chain does not directly pass, but which liquid lubricant is picked up by trailers attached to the chain, and, by the centrifugal force developed as the chain passes about the sprocket, such lubricant is thrown from the trailer against the roof of the casing which houses the chain, and thence drops onto the chain as it passes the upper portion of the sprocket wheel.

The invention will be more fully understood after reference to the accompanying drawings, in which like parts are indicated by similar reference symbols throughout the several views, and in which:

Figure 1 is a vertical sectional view taken through a casing and showing in elevation a chain having the improved device applied thereto.

Fig. 2 is a cross sectional view taken on the line 2—2 in Fig. 1.

Fig. 3 is a perspective view showing one form of the connection between the chain and trailer.

Fig. 4 is a similar view inverted with respect to Fig. 3, showing another form of connection; and Fig. 5 is a view similar to Fig. 4, showing a still further modified form of the connection.

Referring more particularly to the drawings, 1 designates a casing having a top 2, which incloses an endless chain 3, which is arranged to run over the two sprockets 4 and 5.

The chain 3 to which the improved lubricating device is attached may be any of the forms of chains requiring lubrication, and in the present instance I have illustrated the invention as applied to what is known as a silent link chain.

In accordance with the invention, liquid lubricant of a comparatively light consistency is placed in the lower portion of the casing 1; this liquid lubricant being indicated at 6, and being brought to a desired level indicated at 7, which is preferably below the lower portion of the chain 3, so that the chain does not directly come into contact with or pass through the body 6 of such liquid lubricant.

The lubricant, therefore, does not offer any resistance to the movement of the chain, and consequently there is no loss of power due to friction between the chain and lubricant.

The chain 3 is intended to carry one or more trailers, which are flexibly secured to the chain and arranged to be brought into contact with the liquid body 6 of the lubricant when the chain is passing through the lower portion of the casing 1, and the lubricant acquired by the trailer is thereafter thrown by the centrifugal force, developed when that portion of the chain carrying the trailer passes over the sprocket 4, up against the top 2 of the casing above the sprocket 4, as shown to the left in Fig. 1.

This trailer or lubricating device may, of course, take numerous forms, one of which is shown in Fig. 3 to consist of a cotton string 8, having a looped portion 9 fitted to the intermediate part 10 of a link 11 of the chain 3. The shoulders 12 of the link 11 serve to maintain the loop 9 in place and prevent its escaping from the link.

A knot 13 is made in the string or cord after the same has been looped, as shown at 9, to hold the string on the link. It will be seen that this string is so mounted on the link 11 that the major portion thereof extends out at substantially right angles from the chain 3, and is adapted to pass through the lubricant 6, as the chain passes through the lower portion of the casing 1.

This string 8 is thrown out into the right-angled position by the centrifugal force created by the passage of the chain about the periphery of the sprocket 5 so that as the trailer enters the body 6 of the lubricant, it will extend at substantially right angles to the chain 3 and will be in a suitable position to enter such lubricant and acquire a quantity of the same.

At 14 in Fig. 1 one of the trailers is shown in the right-angled position just prior to submersion in the lubricant 6, the arrow in Fig. 1 indicating the direction of movement of the chain 3. The cotton string 8 is, of course, flexible, and at 15 in Fig. 1 is shown the curved position assumed by the trailer after it has passed the distance through the body of the lubricant 6, so that the same obviously yields and does not resist to any great extent the movement of the chain. Moreover, the diameter of the string 8 is very small, and consequently does not afford any great amount of friction surface to the lubricant.

The cotton string 8 is very light and therefore when the same emerges from the lubricant at the other end of the casing, it will readily come under the influence of the centrifugal force created by the passage of the chain over the sprocket wheel 4, and such string is of such a nature as to readily give up and throw off the lubricant, as indicated in Fig. 1.

The lubricant is deposited on the top 2 of the casing in very small drops, which thereafter drip down on the chain 3 approximately above the sprocket 4, and the chain is thus effectually lubricated.

The cotton fiber is especially important, as it avoids serious injury to the hand if brought close to the chain.

As many of these trailers can, of course, be mounted on the chain 3 as desired, and the greater the number the greater will be the lubrication. Moreover, these trailers may be connected side by side, and as shown in the upper part of Fig. 2 three such trailers are indicated as being connected at the two sides and centrally of the chain, while at the bottom of this same figure there are two trailers shown set off the center of the chain and spaced inwardly from the sides. The trailers can be mounted in any suitable number and at any suitable location on the chain in accordance with the amount of lubrication required, and the places where this lubrication is to be effected.

Referring more particularly to Fig. 4, the chain link 11 in this figure is shown to be provided with a perforation 16 through which is passed the wire 17 which forms the trailer. The wire is looped as shown through the perforation 16, and has its outer ends twisted together, as appears at 18, for a suitable distance. This twisted part 18 enters the lubricant and picks up the same. It will be seen that with the wire 17 similar results are produced, and the perforation 16 in the link 11 allows the wire 17 to be flexibly connected thereto.

Referring now more particularly to Fig. 5, the trailer in this instance consists of a wire 19 having a twisted end 20, but here it is not necessary to modify the link 11, as by providing a perforation 16, but the trailer is held in place by a metal clip 21 which embraces the reduced central part of the link 11, and has its free meeting ends 22 provided with registering perforations through which the looped part 19 of the trailer may pass to form a flexible connection therewith.

Of course, the device may be susceptible of embodiment in various other mechanical forms, and the three examples illustrated are only examples of trailers that have been experimented with successfully.

It will be obvious that various modifications might be made in the herein described construction, and in the combination and arrangement of parts which could be used without departing from the spirit of my invention; and I do not mean to limit the invention except as particularly pointed out in the claims.

Having thus described my invention what I claim and desire to secure by Letters Patent of the United States is:—

1. An oiling device for silent chains, comprising a trailer carried by the chain and adapted to pass through a body of lubricant and pick up lubricant therefrom, and a part against which the lubricant from said trailer may be thrown said part being in such position as to allow the lubricant to drop on said chain, substantially as described.

2. In combination with a casing containing lubricant and having a top, and an endless chain operating in said casing above the lubricant, of a trailer carried by said chain and adapted to be brought in contact with the lubricant and to throw the lubricant acquired thereby onto said top above the chain where it may be dropped on the latter, substantially as described.

3. In combination with a casing having a top, an endless chain operating in such casing, and a body of liquid lubricant placed in the lower part of said casing below the chain, of a trailer carried by said chain and adapted to be moved through the body of lubricant, said trailer adapted to be brought under the influence of centrifugal force whereby it may throw the required lubricant onto the top of the casing above said chain, whence it may be dropped onto the latter, substantially as described.

4. In combination with a casing having a closed top, sprockets in said casing, an endless chain moving over said sprockets, and a body of lubricant in the lower part of said casing, the surface level of the lubricant being below the lower part of said chain, of a trailer carried by said chain, and adapted to be brought into contact with the liquid body of the lubricant, said trailer being brought under the influence of centrifugal force as that portion of the chain carrying said trailer passes over the sprocket wheels, such centrifugal action adapted to cause the liquid lubricant acquired by the trailer to be thrown onto the top of said casing where it may drop onto said chain, substantially as described.

JOSEPH EMORY SIRRINE.

Copies of this patent may be obtained for five cents each, by addressing the "Commissioner of Patents, Washington, D. C."